United States Patent
Xu et al.

(10) Patent No.: US 6,628,375 B2
(45) Date of Patent: Sep. 30, 2003

(54) METHOD OF AND A SYSTEM FOR MEASURING A STRESS OR A STRESS DISTRIBUTION, USING A STRESS LUMINESCENT MATERIAL

(75) Inventors: Chao-Nan Xu, Tosu (JP); Morito Akiyama, Tosu (JP); Kazuhiro Nonaka, Tosu (JP); Tadahiko Watanabe, Saga (JP)

(73) Assignee: Agency of Industrial Science and Technology, Tokyo (JP)

( * ) Notice: Subject to any disclaimer, the term of this patent is extended or adjusted under 35 U.S.C. 154(b) by 144 days.

(21) Appl. No.: 09/749,948

(22) Filed: Dec. 29, 2000

(65) Prior Publication Data

US 2001/0017059 A1 Aug. 30, 2001

(30) Foreign Application Priority Data

Feb. 2, 2000 (JP) ........................................ 2000-024974

(51) Int. Cl.[7] .............................................. G01B 11/16
(52) U.S. Cl. ...................................................... 356/32
(58) Field of Search .............................. 356/32, 33–35, 356/35.5, 364–369, 381, 382; 73/800

(56) References Cited

U.S. PATENT DOCUMENTS 4,786,802 A * 11/1988 Yoshii et al. ................ 250/225
4,914,487 A * 4/1990 Croizer et al. ................ 356/35
5,519,486 A * 5/1996 Baird et al. ................. 356/35.5
6,055,053 A * 4/2000 Lesniak ....................... 356/34
6,159,394 A   12/2000 Akiyama et al. ........ 252/301.4

* cited by examiner

Primary Examiner—Michael P. Stafira
(74) Attorney, Agent, or Firm—Oblon, Spivak, McClelland, Maier & Neustadt, P.C.

(57) ABSTRACT

This invention is to provide a method and a system which, by making use of a stress luminescent material, renders it possible to directly observe a stress distribution on the base of a real time without electrical contacts, and to easily measure a stress or a stress distribution and a stress image. Essentially, the invention comprises the steps of adding a stress to a tested body containing a stress luminescent material whose light emission is proportional to the stress, making visually observable a stress distribution over the tested body in accordance with a luminous intensity of the stress luminescent material contained in the tested body, measuring the luminous intensity of the luminescent material of the tested body, comparing the measured value of the luminous intensity with certain correlation data indicating a relationship between the luminous intensity of the stress luminescent material and a stress, thereby obtaining a stress value or a stress distribution over the tested body.

12 Claims, 13 Drawing Sheets

METHOD OF AND A SYSTEM FOR MEASURING A STRESS OR A STRESS DISTRIBUTION, USING A STRESS LUMINESCENT MATERIAL

DETAILED DESCRIPTION OF THE INVENTION

The present invention relates to a method of and a system for measuring a stress or a stress distribution, using a stress luminescent material, which method is capable of easily measuring or monitoring a stress value, a stress distribution and a stress image on a measurement object such as a tested body, without physical contacts.

DESCRIPTION OF THE RELATED ART

Measuring the magnitude of various kinds of stress occurring in different parts of an object has been considered to be extremely important in every aspect of people's daily life, especially in the field of designing a machine or a physical facility.

For this reason, there have been developed various different methods for measuring a stress distribution. Among them, a typical and most generally used method requires that an electric resistance strain gauge be attached to an object to carry out a predetermined stress measurement. However, this method only makes it possible to obtain measured data of a portion where a strain gauge has been attached. If it is required to obtain a stress distribution, a great number of strain gauges have to be attached to a great number of measuring points. As a result, a large amount of labour is needed to complete an operation for attaching a great number strain gauges to a great number of measuring points on an object. Moreover, if an object to be measured is relatively small, attachment of strain gauges will be difficult, making it impossible to measure a stress distribution on a small object.

Furthermore, even if a great number of strain gauges are attached to an object which is to be measured, only the measured points can individually give strain data.

On the other hand, in order to make possible the measurement of a stress distribution on a continuous surface, rather than individually measuring many strain points, there has been developed a thermograpy method based on thermoelastic analysis. That is, when a stress is applied on a object, the volume of the object will be changed. This volume change will be accompanied with a temperature change which is called as thermoelastic effect. Thermograpy is capable of detecting the temperature distribution of an object being measured, so as to measure its stress distribution.

However, the thermograpy not only requires that a periodic stress be added to an object, but also that a synchronism signal of each stress be applied to a camera in order to improve the ratio of S/N (signal/noise). Consequently, it is impossible to perform a stress measurement in a actual operation or a stress measurement in-situ and in real time.

In addition, there has been known another method such as a photoelasticity method in which a transparent resin easy to be measured by an optical means is used to produce a model which is very close to an actual object, a predetermined load is then added to the model so as to measure a stress distribution. However, none of any methods described in the above can be used to easily measure a stress distribution under a condition where the tested body is still being used.

PROBLEMS TO BE SOLVED BY THE INVENTION

The inventors of the present invention, after having conducted the following experiment, has found the following facts. That is, a stress luminescent powder capable of emitting a light upon receiving a stress is mixed with a transparent optical material to produce a bulk body, alternatively thus obtained mixture is applied to an object so as to form a film thereon. In this way, once the bulk body or the film was used as a test material by applying various loads thereon, it was found that those portions receiving more concentrated stress exhibit a higher luminous intensity, and that such a luminous intensity is proportional to the stress so that it will be increased with an increase in the stress, further that it is possible to visualize a distribution of such a stress by naked eyes. Moreover, upon repeating the experiment under various different conditions and after repeating related studies, it was clearly understood that there is a correlation between the luminous intensity and a stress.

The tested body may be formed by a bulk body prepared by mixing a powder of the stress luminescent material with a transparent material, or a film obtained by at first mixing the powder of the stress luminescent material with the transparent material and then applying the mixed materials to the surface of a measurement object. However, the above-mentioned correlation can be used in both of the two cases, i.e., with one case using the bulk body as a tested body, and the other case using the above film to form a tested body, thereby obtaining similar effects.

The present invention has been accomplished in accordance with the above newly found knowledge, and its object is to solve the problems existing in the above-described conventional stress measuring methods. Namely, it is an object of the present invention to provide a method and a system which, by making use of a stress luminescent material, renders it possible to directly observe a stress distribution on the base of a real time without using a cord, and to easily measure a stress or a stress distribution and a stress image.

MEANS FOR SOLVING THE PROBLEMS

In order to solve the above problems, a method for measuring a stress distribution using a stress luminescent material is characterized in that said method comprises the steps of application of a stress to a tested body containing a stress luminescent material whose light emission is proportional to the stress, making visually observable a stress distribution over the tested body in accordance with a luminous intensity of the stress luminescent material contained in the tested body.

Furthermore, the method of the present invention is characterized in that said method comprises the steps of adding a stress to a tested body containing a stress luminescent material whose light emission is proportional to the stress, comparing a detected value of the luminous intensity of the stress luminescent material contained in the tested body with certain correlation data indicating a relationship between the luminous intensity of the stress luminescent material and a stress, thereby obtaining a stress value or a stress distribution over the tested body.

The tested body used in the measuring method of the present invention may be suitably formed by a bulk body prepared by mixing a powder of the stress luminescent material with a transparent material, or is formed using a film obtained by at first mixing the powder of the stress luminescent material with the transparent material and then applying the mixed materials to the surface of a measurement object, or the tested body is formed using a film obtained by at first mixing the powder of the stress luminescent material with an organic binder and then applying the mixed materials to the surface of the measurement object.

The luminous intensity of the stress luminescent material of the tested body may be effectively detected by using a peak value of an emission spectrum obtained through a spectroscope. Alternatively, it is effective that the luminous intensity of the stress luminescent material is detected while at the same time illuminating the tested body using an illumination light having a wave length which is different from the peak value of the emission spectrum. Of course, this can also be done by adding a filter in front of the photodetector, the filter of which can only pass the light with the wavelength of the stress luminescent material.

Moreover, a system for measuring a stress or a stress distribution using a stress luminescent material of the present invention is characterized in that said system comprises a tested body containing a stress luminescent material whose light emission is proportional to the stress; a photodetector for detecting the luminous intensity of the stress luminescent material of the tested body; computing means capable of comparing a detected value from the photodetector with certain correlation data indicating a relationship between the luminous intensity of the stress luminescent material and a stress, and then computing a stress over the tested body; a display device capable of displaying the tested body's received stress which has been computed by the computing means.

In this measuring system, an optical path such as a glass fiber may be connected between the tested body and the photodetector. Further, it is also possible that a spectrometer for detecting the peak value of an emission spectrum of the stress luminescent material may be connected between the tested body and the photodetector.

Furthermore, a system for measuring a stress image using a stress luminescent material of the present invention is allowed to include a tested body containing a stress luminescent material whose light emission is proportional to the stress; photographing means capable of taking a two-dimensional image of the luminous intensity of the luminescent material contained in the tested body; and a display device capable of displaying as a stress image by the photographed luminous intensity.

With the use of the above measuring method, the luminous intensity of the tested body containing the stress luminescent material is proportional to a compression stress, a tensile stress and a shearing stress so that it will increase with an increase in any of these stresses. Accordingly, it is possible to visualize a stress distribution over the tested body in accordance with a luminous intensity of the stress luminescent material contained in the tested body.

Furthermore, the correlation data indicating a relationship between a luminous intensity and a stress may be prepared in advance by way of experiment. Then, if a stress is applied to the tested body and the luminous intensity at a specific point of the tested body is measured, and if the measured value is compared with the correlation data indicating a relationship between a stress and the luminous intensity of the above stress luminescent material, it is possible to know the stress value on the specific point of the tested body since a stress corresponding to the detected luminous intensity may be made known.

Then, if the measuring point is moved and stress values on different positions of a tested body are obtained, it is possible to quantitatively know a stress distribution over the tested body.

The measurement of a stress or a stress distribution over a tested body may be carried out by a measurement system including a photodetector for detecting the luminous intensity of the stress luminescent material of the tested body; a computing means capable of comparing a detected value from the photodetector with certain correlation data indicating a relationship between the luminous intensity of the stress luminescent material and a stress, and then computing a stress on the tested body; a display device capable of displaying the tested body's received stress which has been computed by the computing means. Therefore, it is possible to efficiently and correctly measure and record the stress or the stress distribution over the tested body.

Furthermore, the luminous intensity of the stress luminescent material of the tested body may be detected only by using a peak value of an emission spectrum obtained through a spectrometer. Alternatively, the luminous intensity of the stress luminescent material may be detected while at the same time illuminating the tested body using an illumination light having a wavelength which is different from the peak value of the emission spectrum. In this way, it is possible to remove an undesired influence from the surrounding lights and to improve a measurement precision. Of course, this can also be done by adding a filter in front of the photodetector, the filter of which can only pass the light with the wavelength of the stress luminescent material.

In addition, since the luminous intensity of each point on the tested body will change corresponding to a received stress, if a two-dimensional luminescent image is photographed, it is possible to obtain a stress image indicating a two-dimensional stress distribution and its change with time.

BRIEF DESCRIPTION OF THE DRAWINGS

FIG. 9A is used to illustrate a pellet-like tested body receiving a compression stress, FIG. 9B is used to schematically indicate a stress being exerted on the pellet, and FIG. 9C is used to indicate a correlation between a stress analysis and a luminous intensity.

FIG. 10A is used to indicate a state where a tensile stress has been added in a rectangular plate having a circular hole formed on the center thereof, and FIG. 10B is used to indicate the results of stress analysis using a stress luminescent image.

FIG. 11A is used to illustrate a state where a compression stress is being added to a pellet-like tested body, FIG. 11B is used to indicate a correlation between a wavelength and a luminous intensity, and FIG. 11C is used to indicate a correlation between a load and a luminous intensity at the spectrum peak.

FIG. 12A is used to illustrate a state where a frictional load is being added to a tested body, FIG. 12B is used to indicate a correlation between a wavelength and a luminous intensity, and FIG. 12C is used to indicate a correlation between a load and a luminous intensity at the spectrum peak.

FIG. 13A is used to illustrate a state where an impact load is being added to a tested body, FIG. 13B is used to indicate a correlation between an impact load and a luminous intensity. The inset indicates the response cure of the luminous intensity to mechanical impact.

DESCRIPTION OF THE EMBODIMENTS

Figure 1A:
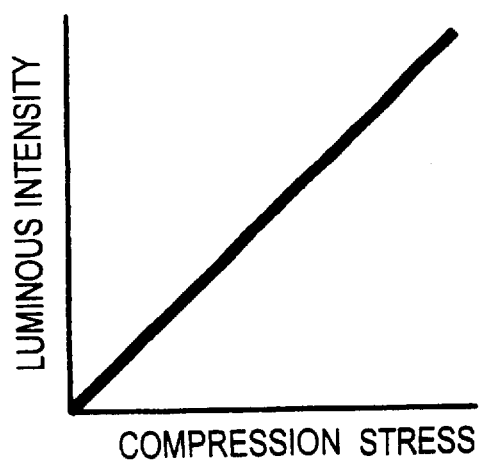
FIG. 1A to FIG. 1C are used to explain the principle of the present invention, schematically indicating a correlation between a stress such as a compression stress, a tensile stress and a shear stress on one hand and a luminous intensity on the other.
Figure 1B:
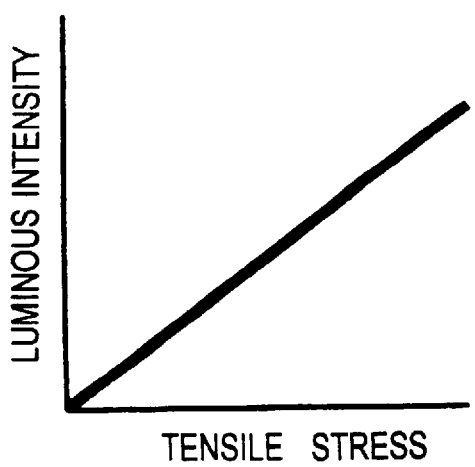
Figure 1C:
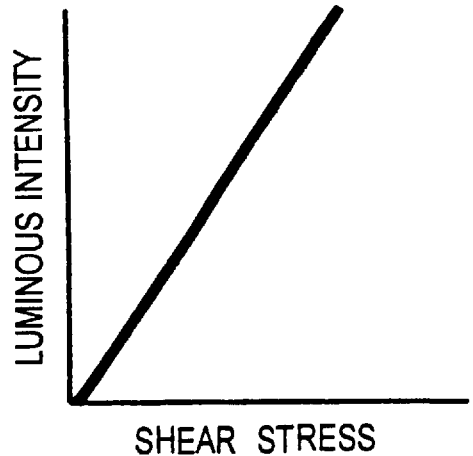

FIG. 1 is used to explain some correlations between stresses and a luminous intensity, in order to explain the principle of the present invention. In fact, when the inventors of the present invention applied a stress to a tested body containing a luminescent material and then tested the correlations between the luminous intensity and the stresses on the tested body, it was confirmed that the luminous intensity would become strong if there is an increase in a compression stress, a tensile stress and a shearing stress (torque), as shown in FIGS. 1A to 1C.

Here, the tested body is a bulk body formed by mixing a powder of stress luminescent material with a transparent resin and other transparent materials. Alternatively, the tested body may also be formed by mixing a powder of the above stress luminescent material with a transparent material, and then coating the surface of a measured object with a mixture formed through such mixing. The above-mentioned correlations are similarly obtained in both of the above cases, i.e., with one case using a bulk body as a tested body, and the other case using a coating film to form a tested body, thereby obtaining similar results.

In this way, once a stress is exerted on a tested body containing a stress luminescent material whose luminous intensity is proportional to a stress exerted thereon, a luminescence will become stronger on an area receiving a larger stress. Accordingly, it is possible to visualize a stress distribution on the tested body, in accordance with the luminous intensity of the stress luminescent material coated on the tested body.

Further, an experiment may be carried out to obtain some correlation data indicating a relationship between the luminous intensity on one hand, and a compression stress, a tensile stress or a shearing stress (torque) on the other, as shown in FIGS. 1A to 1C. After that, a stress may be applied to the tested body serving as a measurement object, so as to measure the luminous intensity of a certain specific point on the tested body, followed by a comparison between the measured value and the correlation data. At this time, since a stress can be known corresponding to a luminous intensity which has been measured, it is allowed to obtain the value of a stress being exerted on that specific point of the tested body.

Then, if the measuring point is moved so as to obtain stress values on different portions over the tested body, it is allowed to quantitatively obtain a stress distribution over the tested body.

In the case where a tested body is formed by a bulk body, such a measurement is extremely useful for analyzing a three dimensional stress of a model prepared for the purpose of designing. On the other hand, in the case where a tested body is formed using a coating layer, the above measurement is extremely useful for measuring a stress distribution over an actual object.

Figure 2:
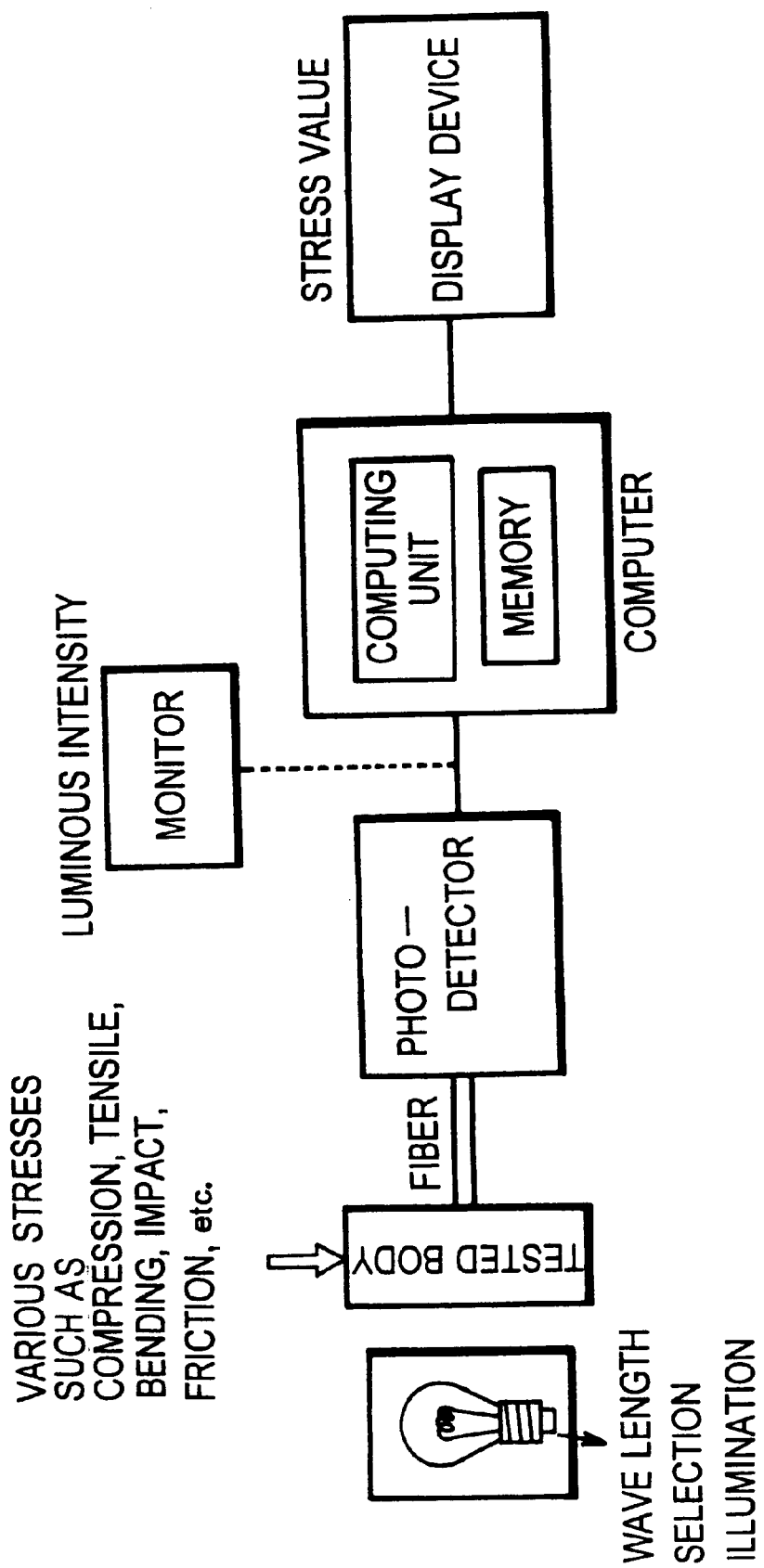
FIG. 2 is a block diagram showing the construction of a system for observing and analyzing a local stress, representing one embodiment of the present invention.

FIG. 2 shows the construction of an embodiment indicating a measuring system of the present invention, based on the above idea.

In the present embodiment, under a condition where a load such as a compression, a tensile, a bending, an impact or a friction is exerted on a tested body, the luminous intensity of a specific point over the tested body can be detected by a photodetector. The detected luminous intensity can be observed on a monitor. Meanwhile, the measured value of the luminous intensity is compared with the correlation data stored in a memory of a computer, and is computed in a computing unit. In this way, a stress value signal computed in the computing unit is output to a display device so as to display the stress value of the specific point on the tested body. At this time, if the measuring point is moved, it is possible to display a stress distribution of the tested body on the display device.

Here, although an optical fiber is provided between the photodetector and the tested body, it is also possible to use an optical lens rather than such an optical fiber.

In the embodiment shown in FIG. 2, although it has been described that a measured value of a luminous intensity may be converted into a stress value by virtue of a computing unit of a computer, the measuring method of the present invention should not be limited to such a specific conversion.

Further, since a luminous intensity will be different from place to place on different points on the tested body corresponding to different stresses on these points, if a two-dimensional luminescent image is photographed, it will be possible to obtain a two-dimensional stress distribution and a stress image which changes with time.

Figure 3:
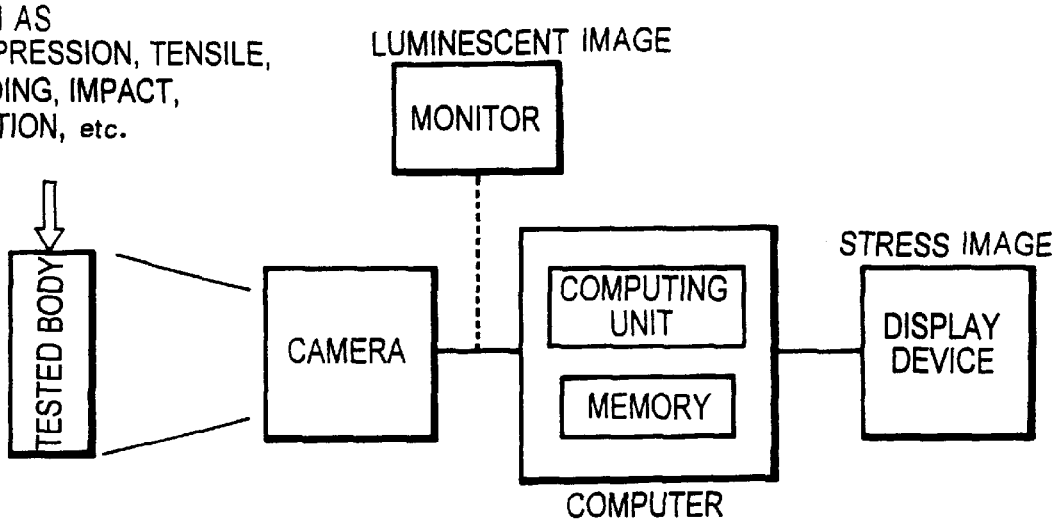
FIG. 3 is a block diagram showing the construction of a system for observing and analyzing a two-dimensional stress image.

FIG. 3 shows the construction of another embodiment of the present invention, based on the above idea, using a video camera instead of a photodetector.

Figure 4:
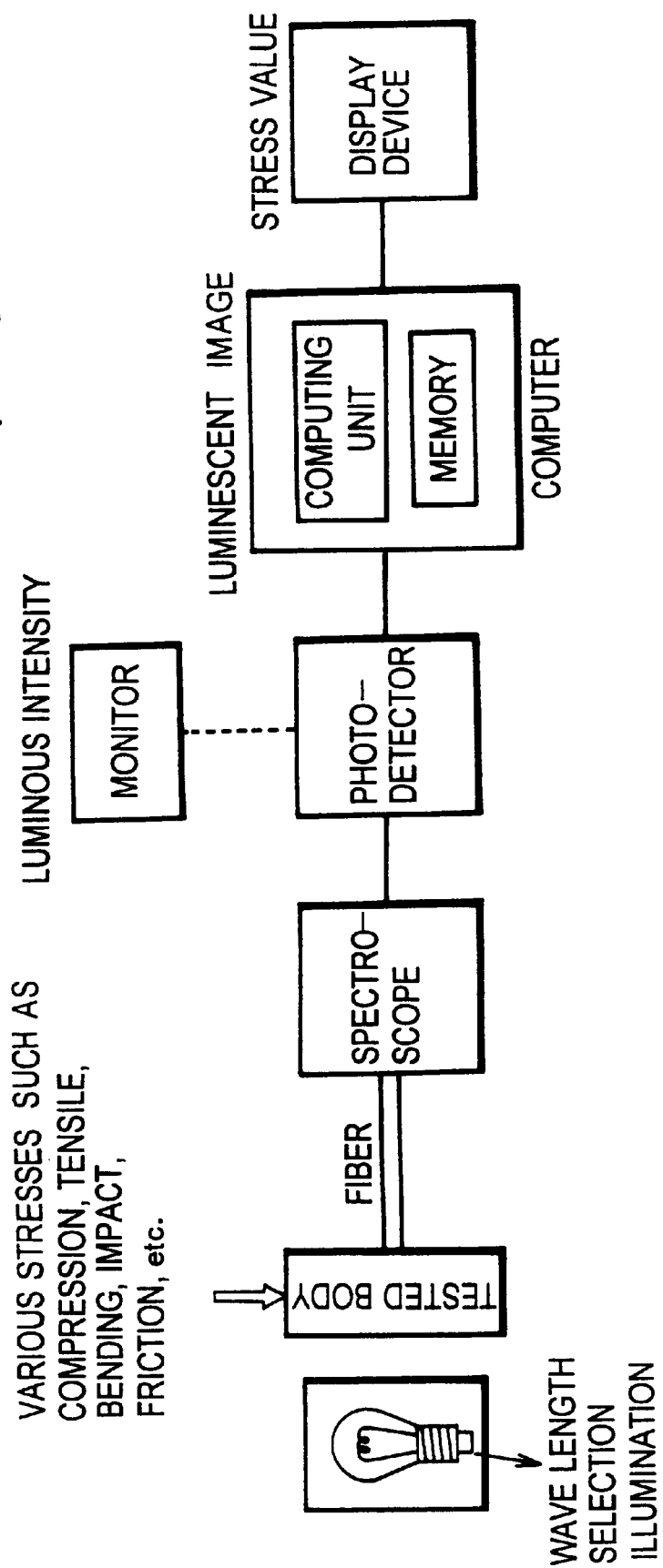
FIG. 4 is a block diagram showing the construction of a system for observing and analyzing another two-dimensional stress image.

Furthermore, as shown in an embodiment of FIG. 4, it is possible to provide a spectroscope or a filter before the photodetector.

With the use of the spectroscope, once merely the peak value of an emission spectrum is detected, it is all owed to obtain a luminous intensity at a central wavelength of the luminescence. Moreover, it has been understood from an experiment that a correlation between the luminous intensity and a stress is similar to that shown in FIG. 1, indicating that an increase in a stress will directly cause the luminescence peak value to be linearly increased.

With the use of such a correlation, by detecting merely the emission spectrum of a stress luminescent material, it is possible to measure a stress or a stress distribution over a tested body.

In this way, if an undesired influence from surrounding lights is removed, it is permitted to ensure an improved precision for the measurement.

However, in order to measure a stress with a high precision, it is necessary to reduce as much as possible an interference from surrounding lights, and to remove some lights whose luminous intensity is not proportional to a stress.

For this reason, as a surrounding illumination light it is favourable to use a light having a wave length which is clearly different from that of a stress luminescence. For example, as shown in FIG. 2 and FIG. 4, an illumination means for irradiating a tested body may be a wavelength selectable illumination means which is capable of producing a light having a wave length different from the peak value of an emission spectrum of a stress luminescent material.

In the case where a luminescent material is a defect-controlled type SAO-E material, since a stress luminescence produces a green light having a central wavelength of 520 nm, it is preferred to use a red lamp having a wavelength of 600 nm or more, thereby effecting an illumination by using a wavelength selectable illumination means.

Although it has been described in the above embodiments that a signal indicating a stress is converted into a digital signal so as to be stored, this process may be accomplished by using a digital media such as a commonly used digital camera and a CCD camera. Alternatively, it is allowed to use an analogue memory means such as film, photograph and video tape.

EXAMPLES

Next, several typical examples using the above measuring system will be described in detail below.

Example 1

This is an example using a measuring system shown in FIG. 2 to analyze a local stress when a tested body is a bulk body.

At first, a tested body was prepared in the following process. Namely, various necessary components were taken by weighing the weights thereof, in a manner such that a defect-controlled type SAO-E stress luminescent material may be formed by strontium carbonate, europium oxide and alumina and has a composition of $Sr_{0.985}Al_2O_4:Eu_{0.01}$. Then, the above components were mixed together and burned in an air atmosphere at a temperature of 800° C. for 60 minutes, followed by a further burning treatment in a reductive atmosphere (5% $H_2$/Ar) at a temperature of 1300° C. for 4 hours. Afterwards, the burned material was ground, thereby obtaining a powder material which was a stress luminescent material.

Subsequently, the powder material obtained in the above process was mixed with an optical resin in accordance with a weight ratio of 50 wt %, thereby obtaining tested bodies S1 to S6 having shapes shown in Table 1.

Table 1 Shapes of Tested Bodies

S1: square cubic body 20×20×20 mm
S2: rectangular parallelepiped body W50×L100×t10 mm
S3: solid cylindrical body φ10×L 250 mm
S4: rectangular parallelepiped body W30×L55×t13 mm
S5: pellet φ20×thickness 25 mm
S6: rectangular plate (W50×L100×t10 mm) formed with a center hole having a diameter of 25 mm The above tested bodies were then subjected to several tests using a material tester, thereby effecting several predetermined tests including a compression test, a tensile test, a bending test, a torsional test and an impact test.

Figure 5:
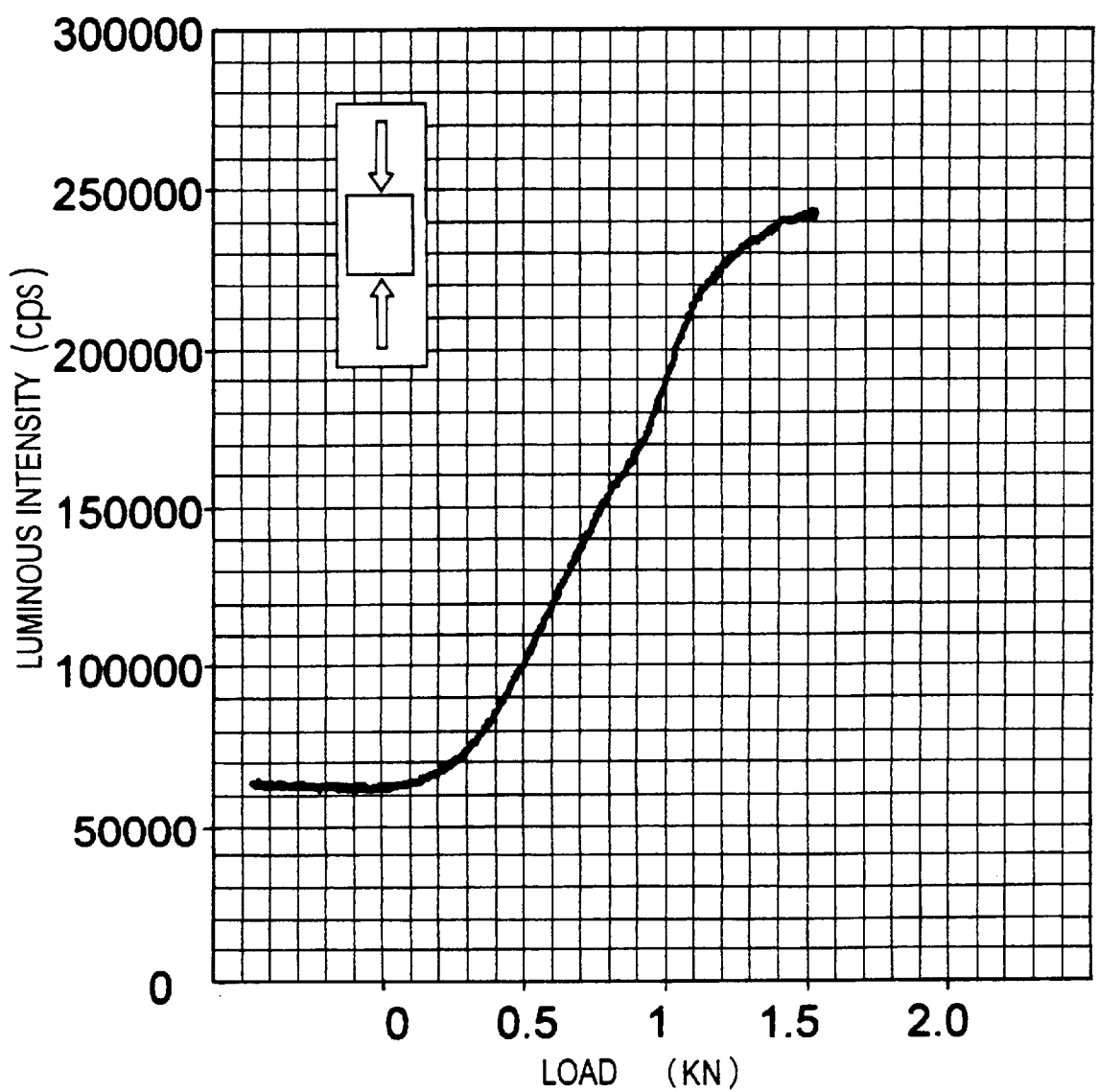
FIG. 5 is a graph indicating how the luminous intensity of a stress luminescent material depends upon a load.

FIG. 5 is a graph showing a correlation between a compression stress and a luminous intensity of tested body S1. As shown in the graph, even when a load is increased, since a resin forming the tested body will be plastically deformed and thus a stress will not be increased, its luminous intensity will be saturated. Here, the detectable stress range depends upon the mechanical strength of a tested body. If a tested body has a high mechanical strength, its luminous intensity will be proportional to a stress in a large stress range. Further, it has been understood that although a stress detecting sensitivity depends on a tested body itself, a tested body having a lower hardness will produce a higher stress detecting sensitivity.

Figure 6:
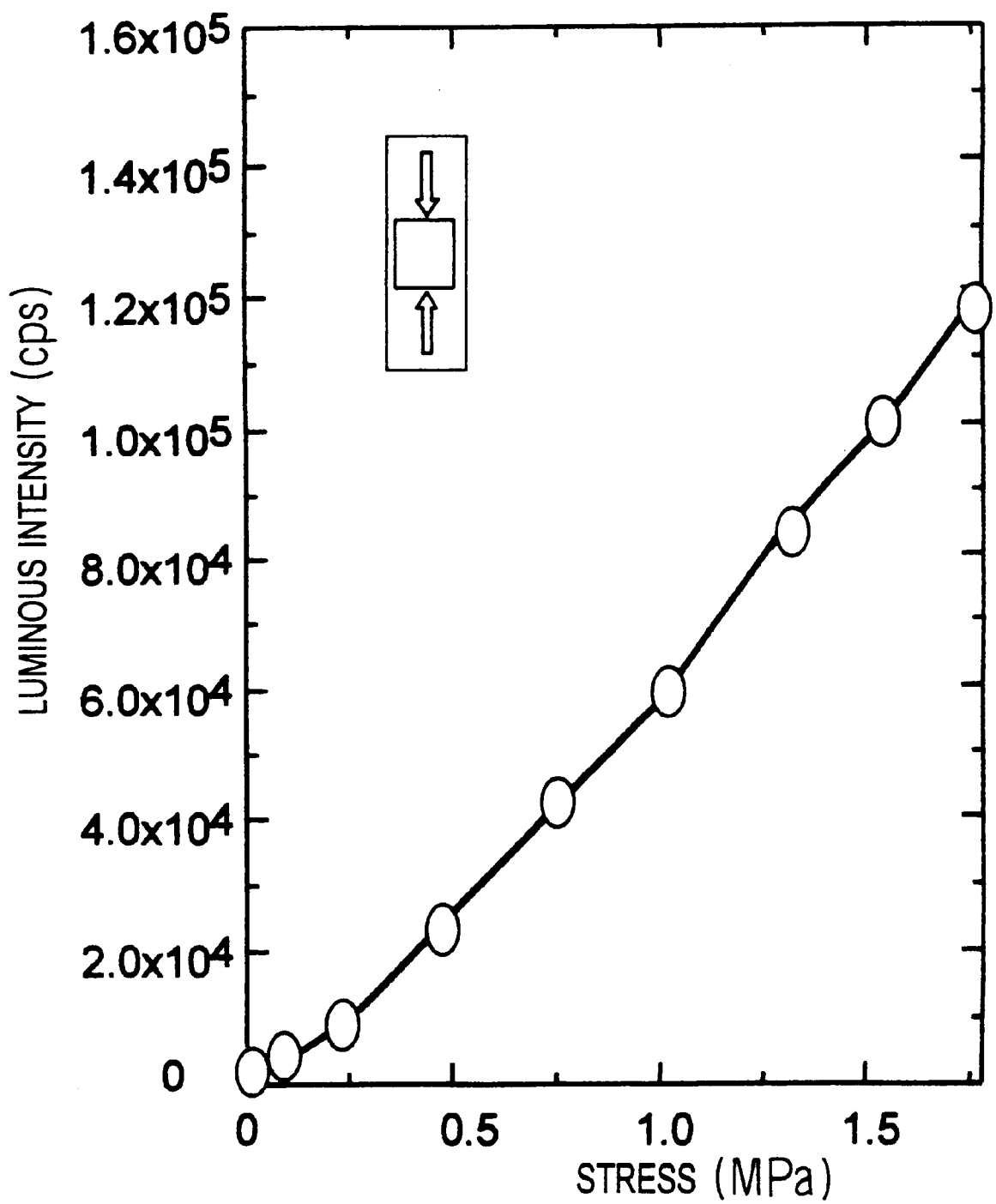
FIG. 6 is a graph indicating a correlation between a stress and a luminous intensity obtained by deducting the background signal when a stress is not added.

Here, if a background signal is deducted from the luminous signal, it is understood from FIG. 6 that there is a range in which the luminous intensity is proportional to a stress and thus it can directly increase due to an increase in the stress. In this case, the stress detecting sensitivity is 0.1 MPa, and a strain sensitivity of the stress luminescent material at this time is $3 \times 10^{-7}$, proving an extremely high strain detecting sensitivity.

Moreover, the luminous intensity of a stress luminescent material also depends upon a changing speed of a stress, and it has been understood that a higher changing speed can produce a stronger luminous intensity, For this reason, although a relative value of a stress distribution will not be affected by the stress changing speed, if a relative value is necessary to be converted into an actual stress value, it is required to perform a compensation of the stress changing speed, using an acceleration sensor such as a piezoelectric type sensor.

Figure 7:
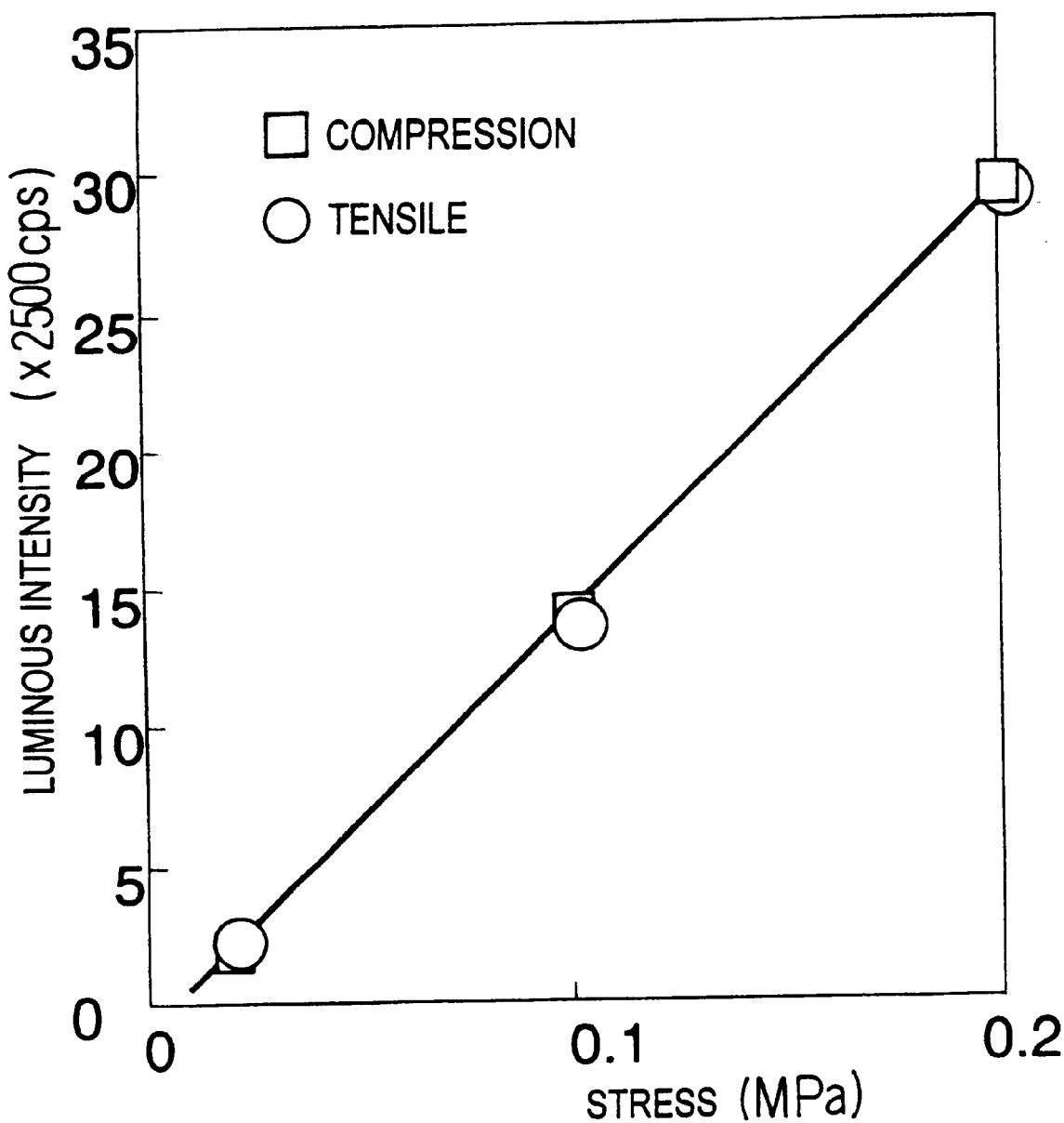
FIG. 7 is a graph indicating how the luminous intensity depends on a compression stress and how it depends upon a tensile stress, and showing a comparison between the two conditions.

The tested body S2 was subjected to a tensile test, with the test results shown in FIG. 7. As shown in the figure, an increase in a tensile stress will cause an increase in the luminous intensity, so that the stress luminescence makes it possible to detect a tensile stress with a high sensitivity.

Figure 8:
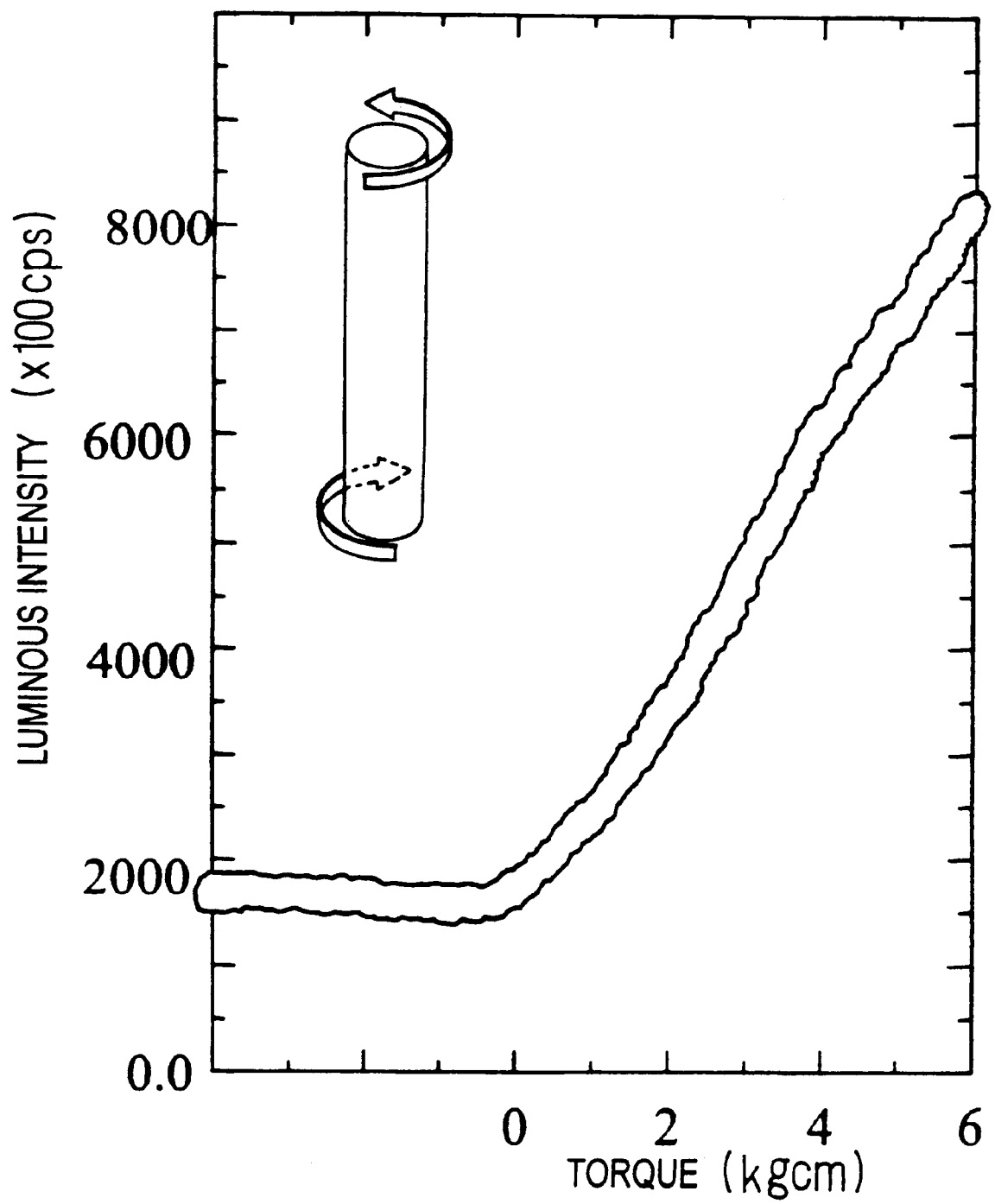
FIG. 8 is a graph indicating the dependence of the luminous intensity upon a shearing stress (torque).
Figure 9A:
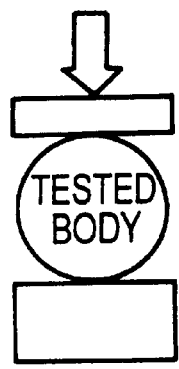
FIG. 9A to FIG. 9C show an example of analyzing a compression stress distribution image.
Figure 9B:
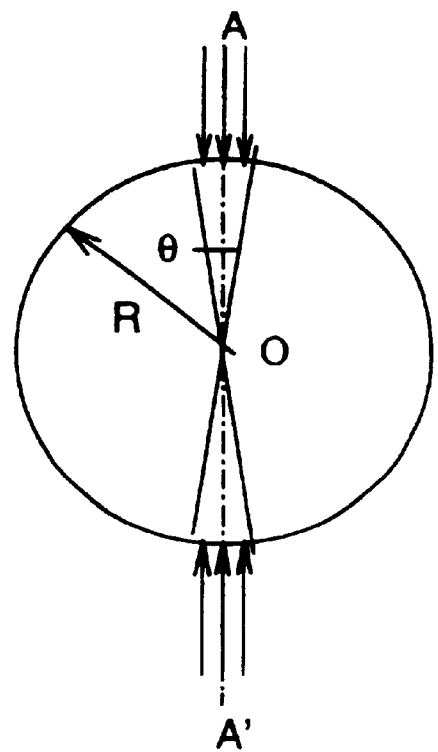
Figure 9C:
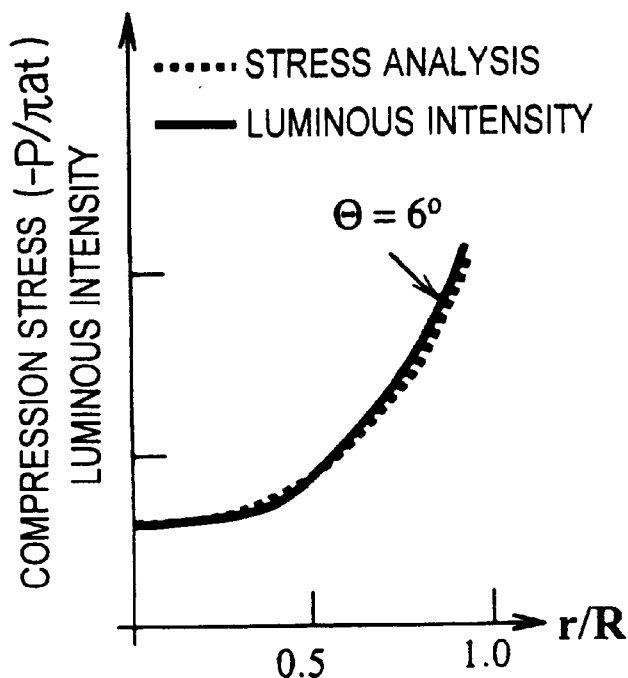
Figure 10A:
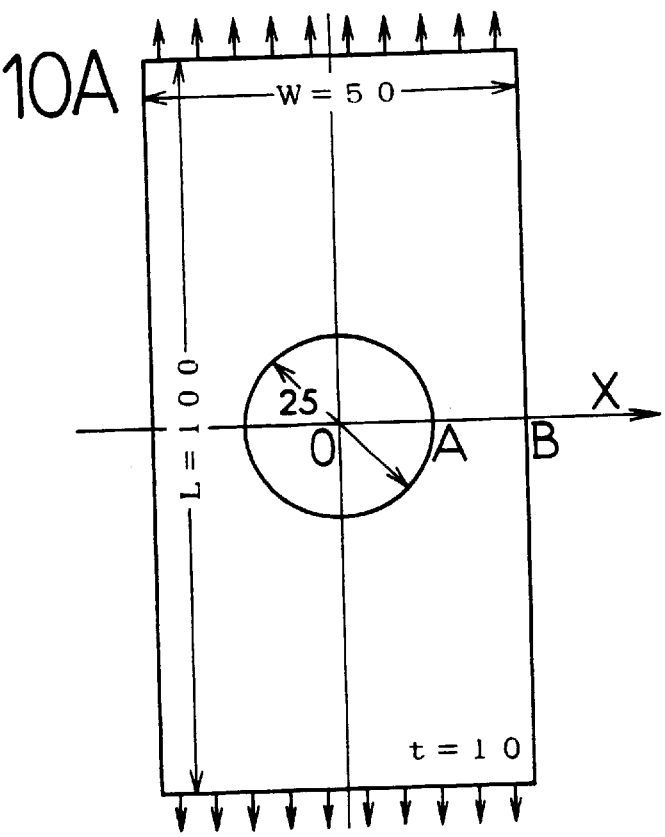
FIG. 10A and FIG. 10B show an example of analyzing a tensile stress distribution image.
Figure 10B:
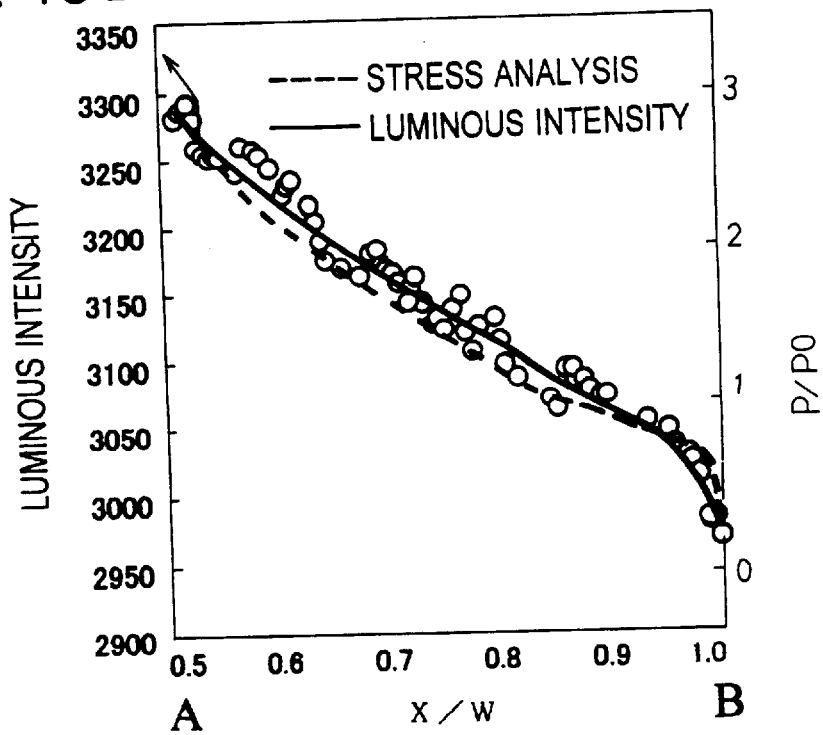

The tested body S3 was subjected to a torsional test, with the test results shown in FIG. 8. As shown in the figure, an increase in a torque will cause an increase in the luminous intensity, so that the stress luminescence makes it possible to detect a shearing stress with a high sensitivity. In this way, with the use of the method according to the present invention, it has become possible to easily carry out a torsion measurement which was proved impossible in a prior art when using a thermograpy technique employing an infrared camera Example 2

This is an example of analyzing a stress image using a measuring system shown in FIG. 3.

The tested body S4 was subjected to a bending test, and a stress picture was measured on the base of a real time. As a result, it was understood that using a stress luminescent material makes it possible to monitor a mobile stress distribution in a real time.

It is understood from the above facts that the measuring method of the present invention, as compared with a conventional method, makes it possible to extremely easily and continuously obtain a stress image with a high sensitivity.

FIGS. 9A to 9C and FIGS. 10A and 10E are used to illustrate examples of analyzing stress distribution images, indicating a compression stress and a tensile stress exerting on the tested bodies S5 and S6.

The stress distributions calculated from the stress luminescent images have been proved to be coincident with the results analyzed by using Finite Element Method or strain gauge method. Thus, it is understood from this fact that using the method of the present invention makes it possible to easily monitor various stress distributions.

Tested bodies similar to the tested bodies S1 to S6 were prepared using a stress luminescent material and an optical resin but with different weight ratios, and it was found the similar stress analysis is applicable in a wide-ratio range from 1 to 99 wt %.

Although the above tested bodies are formed by mixing a powder of a stress luminescent material with an optical resin, in fact, it is possible to use not only the optical resin but also a composite containing various inorganic substances such as alumina and silica and various organic substances such as a plastic, a polymer and a rubber, thereby obtaining a similar effects. At this time, even a stress luminescent body formed with a mixing ratio of 0.1 wt %, can still produce a satisfactory effect.

Example 3

This is an example of analyzing a stress exerting on an object which is coated with a stress luminescent film.

A stress luminescent material SAO-E powder was mixed at a weight ratio of 90 wt % with a transparent resin, so as to obtain a paste. The obtained paste was then applied to the surface of a measurement object to form a paste layer having a thickness of 0.01 mm. Subsequently, the object was hardened at a temperature from a room temperature to 80° C., thereby obtaining results similar to those obtained in the case where a bulk body is used as a tested body.

Furthermore, it was understood that a stress distribution image can be obtained, in a manner similar to the case where the bulk body is used as a tested body.

Figure 11A:
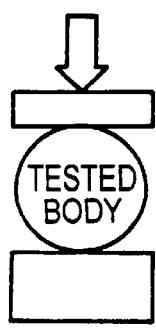
FIG. 11A to FIG. 11C show an example of analyzing a stress luminescent image in relation to a compression force.
Figure 11B:
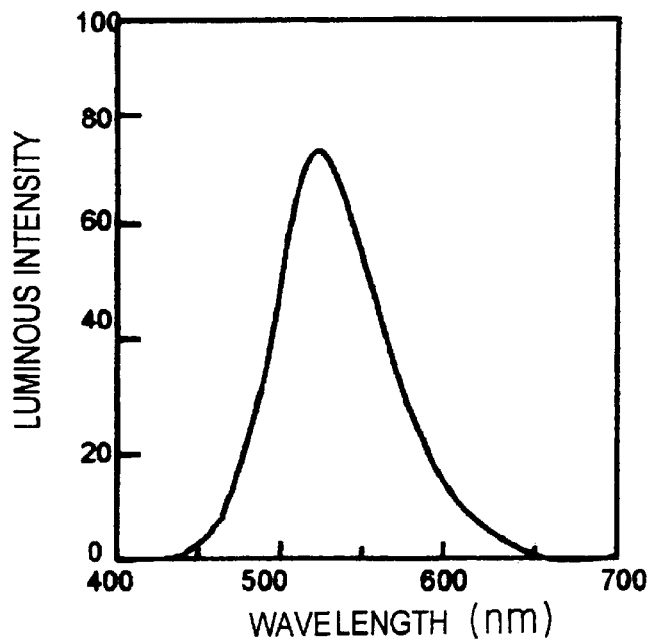
Figure 11C:
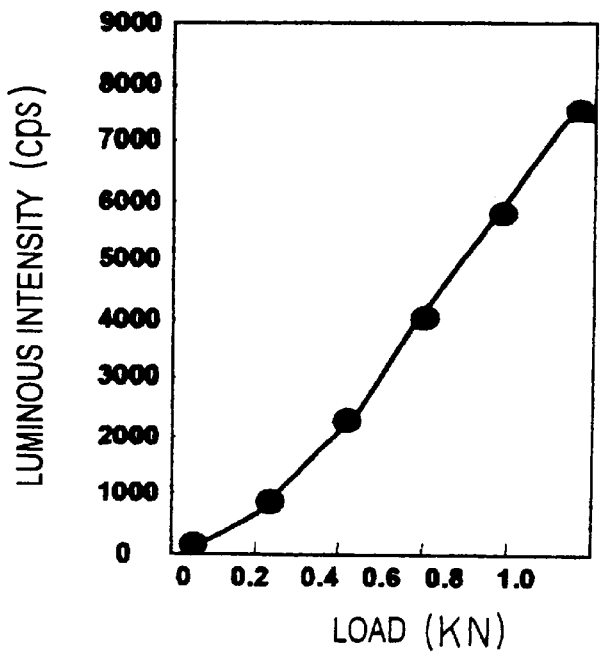

Then, a system shown in FIG. 4 was used to measure an emission spectrum at this time. Meanwhile, an illumination having a wave length different from the peak value of the emission spectrum was used as an illumination to irradiate the tested body. As a result, it was found that the central wave length of the emission spectrum was 520 nm (see FIG. 11B) and its peak value was directly proportional to an increase in the stress.

As a film formation method, besides the above-described method of applying a resin containing a stress luminescent material, it will also be effective to use other coating method such as a heat coating and a spray coating. Furthermore, it is also useful to directly apply a stress luminescent material throughout which an organic binder and an interface active agent have been dispersed. Alternatively, it is convenient to form the stress luminescent material into a sheet (film) and then attach the film to a tested body so as to measure a stress distribution.

Moreover, in addition to the above coating methods, it is also possible to use a physical deposition method. In more detail, it is favourable to use an ion plating method, a sputterring method, an ion mixing method or a vapor deposition method.

In order to detect a stress exerting on an object with a high sensitivity, it is necessary to optimize the elastic coefficient of a stress luminescent material or a stress luminescent film, or a stress luminescent coating film. Usually, it is favourable to select a stress luminescent material or a stress luminescent film, or a material forming a stress luminescent coating film, with each material or film having an elastic coefficient which is the same as that of a measurement object. However, the elastic coefficient of a stress luminescent coating film can be controlled by properly selecting an application method, a polymer and an organic binder.

Figure 12A:
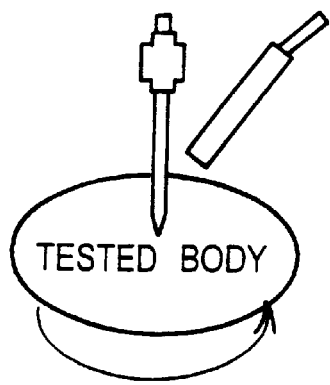
FIG. 12A to FIG. 12C show an example of analyzing a stress luminescent image in relation to a frictional load.
Figure 12B:
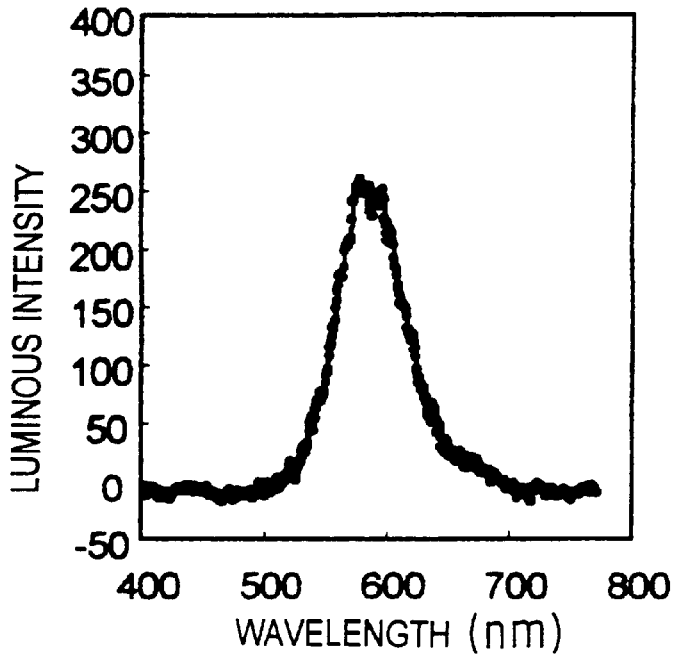
Figure 12C:
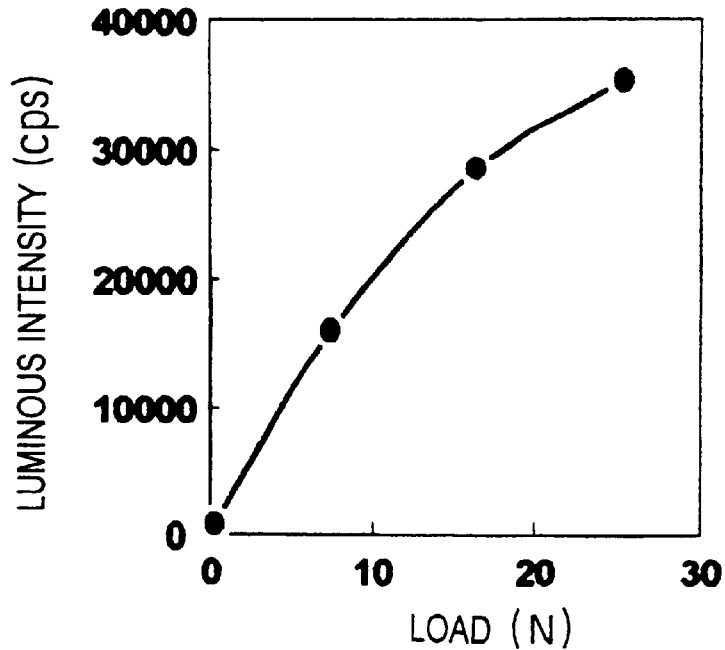
Figure 13A:
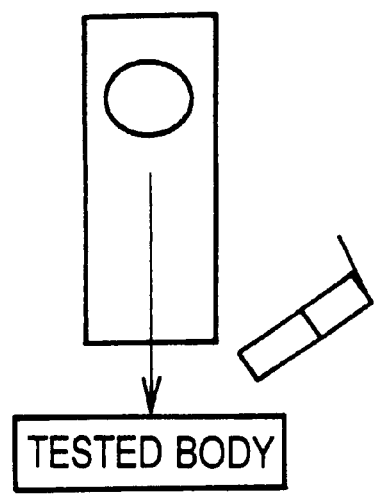
FIG. 13A and FIG. 13B show an example of analyzing a stress luminescent picture in relation to an impact load.
Figure 13B:
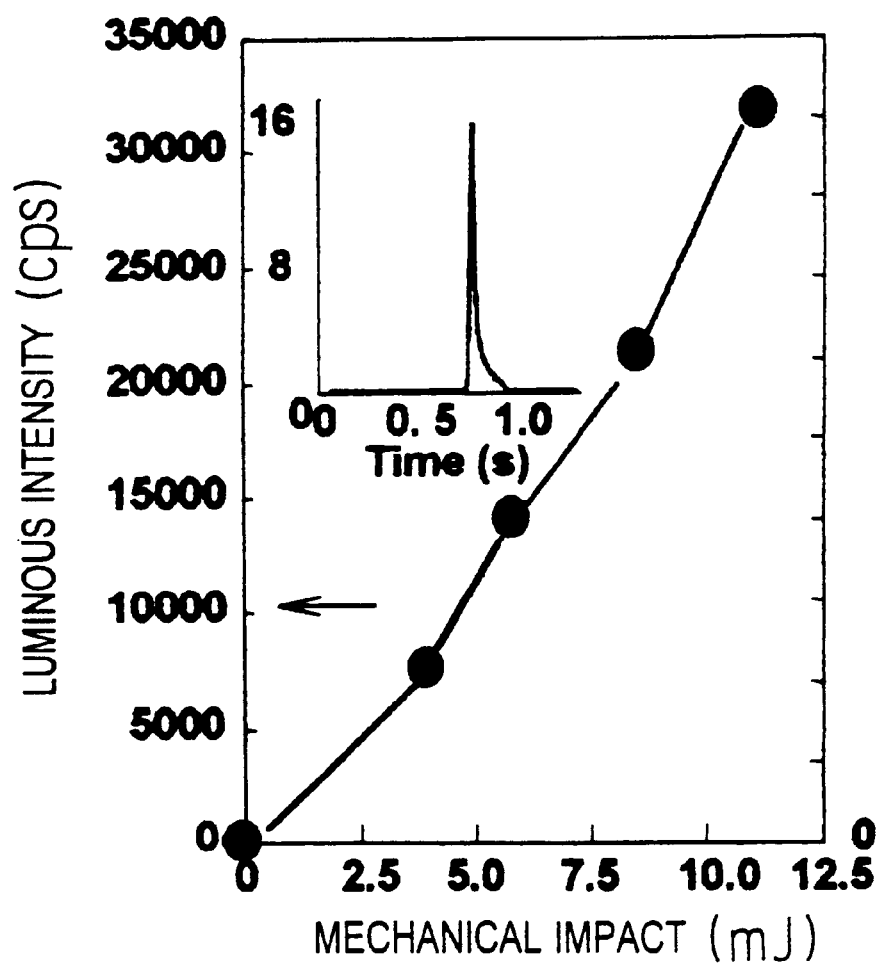

FIG. 12A to FIG. 12C as well as FIG. 13A and FIG. 13B are used to indicate several examples in which an ion plating method was employed to form ZnS:Mn film on a quartz glass, and a stress luminescent image based on a friction load was analyzed. Also another example was analyzed involving a stress luminescent image based on an impact load.

Furthermore, these figures also show how a stress luminescent spectrum and its central wavelength peak depend upon a load.

Moreover, with respect to various other stresses, it is also possible to detect the stresses and obtain some stress images, in the same manner as in the case where a tested body is a bulk body.

In this way, if a stress luminescent material is applied to the surface of a tested body using one of the above methods, and if the luminous intensity of a thus formed stress luminescent film is measured, it is possible to analyze the stress on a tested body, obtain a stress distribution and a stress image, in the same manner as in the case where a tested body is a bulk body.

In addition, besides the above-described SAO-E material, similar effects were obtained when using a stress luminescent material, ZnS:Cu, ZnS:Mn, a spinel structure, $MAl_2O_4$:N (however, M=Mg, Ca, Sr, Ba; N=Eu, Ce, Tb, Sm, Cu, Mn), $M_3Al_2O_6$:N, $MAl_{12}O_{19}$:N, a melilite oxide, $Ca_2Al_2SiO_7$:N, $MMgAl_{10}O_{17}$:N, $M_3MgSi_2O_8$:N (here, M=Ba, Sr, Ca; N=Eu, Ce, Sm, Cu, Mn), or the like.

What is claimed is:

1. A method for measuring a stress distribution using a stress luminescent material, said method comprising:
   adding a stress to a tested body containing a stress luminescent material whose light emission is proportional to the stress; and
   making visually observable a stress distribution over the tested body in accordance with a luminous intensity of the stress luminescent material contained in the tested body.

2. A method for measuring a stress or a stress distribution using a stress luminescent material, said method comprising:
   adding a stress to a tested body containing a stress luminescent material whose light emission is proportional to the stress; and
   comparing a detected value of the luminous intensity of the stress luminescent material contained in the tested body with certain correlation data indicating a relationship between the luminous intensity of the stress luminescent material and a stress, thereby obtaining a stress value or a stress distribution over the tested body.

3. A method for measuring a stress or a stress distribution using a stress luminescent material according to claim 1 or 2, wherein said tested body is formed by a bulk body prepared by mixing a powder of the stress luminescent material with a transparent material, or is formed using a film obtained by at first mixing the powder of the stress luminescent material with the transparent material and then applying the mixed materials to the surface of a measurement object, or the tested body is formed using a film obtained by at first mixing the powder of the stress luminescent material with an organic binder and then applying the mixed materials to the surface of the measurement object.

4. A method for measuring a stress or a stress distribution using a stress luminescent material according to claim 1 or 2, wherein the luminous intensity of the stress luminescent material of the tested body is detected by using a peak value of an emission spectrum obtained through a spectroscope.

5. A method for measuring a stress or a stress distribution using a stress luminescent material according to claim 4, wherein the luminous intensity of the stress luminescent material is detected while at the same time illuminating the tested body using an illumination light having a wavelength which is different from the peak value of the emission spectrum.

6. A system for measuring a stress or a stress distribution using a stress luminescent material, said system comprising:
- a tested body containing a stress luminescent material whose light emission is proportional to the stress;
- a photodetector for detecting the luminous intensity of the stress luminescent material of the tested body;
- computing means for comparing a detected value from the photodetector with certain correlation data indicating a relationship between the luminous intensity of the stress luminescent material and a stress, and then computing a stress over the tested body; and
- a display device configured to display the tested body's received stress which has been computed by the computing means.

7. A system for measuring a stress or a stress distribution using a stress luminescent material according to claim 6, wherein said tested body is formed by a bulk body prepared by mixing a powder of the stress luminescent material with a transparent material, or is formed using a film obtained by at first mixing the powder of the stress luminescent material with the transparent material and then applying the mixed materials to the surface of a measurement object, or the tested body is formed using a film obtained by at first mixing the powder of the stress luminescent material with an organic binder and then applying the mixed materials to the surface of the measurement object.

8. A system for measuring a stress or a stress distribution using a stress luminescent material according to claim 6 or 7, further comprising an optical path connected between the tested body and the photodetector.

9. A system for measuring a stress or a stress distribution using a stress luminescent material according to claim 6 or 7, further comprising a spectroscope configured to detect the peak value of an emission spectrum of the stress luminescent material, the spectroscope being connected between the tested body and the photodetector.

10. A system for measuring a stress picture using a stress luminescent material, said system comprising:
- a tested body containing a stress luminescent material whose light emission is material proportional to the stress;
- photographing means for taking a two-dimensional picture of the luminous intensity of the luminescent material contained in the tested body; and
- a display device configured to display as a stress image from a photographed luminous intensity.

11. A system for measuring a stress or a stress distribution using a stress luminescent material according to claim 6, further comprising an optical path connected between the tested body and the photodetector, wherein the optical path comprises a glass fiber.

12. A system for measuring a stress or a stress distribution using a stress luminescent material according to claim 7, further comprising an optical path connected between the tested body and the photodetector, wherein the optical path comprises a glass fiber.

* * * * *